United States Patent
Albrecht et al.

(10) Patent No.: US 10,507,984 B2
(45) Date of Patent: Dec. 17, 2019

(54) CONVEYOR DEVICE AND METHOD FOR CONVEYING AN OBJECT

(71) Applicants: TDK—Micronas GmbH, Freiburg (DE); Universitaet des Saarlandes, Saarbruecken (DE)

(72) Inventors: Stefan Albrecht, Freiburg (DE); Matthias Nienhaus, Saarbruecken (DE)

(73) Assignee: TDK-MICRONAS GMBH, Freiberg (DE)

( * ) Notice: Subject to any disclaimer, the term of this patent is extended or adjusted under 35 U.S.C. 154(b) by 0 days.

(21) Appl. No.: 15/665,084

(22) Filed: Jul. 31, 2017

(65) Prior Publication Data

US 2018/0029804 A1    Feb. 1, 2018

(30) Foreign Application Priority Data

Aug. 1, 2016    (DE) .................. 10 2016 114 182

(51) Int. Cl.
*B65G 43/08* (2006.01)
*B65G 13/04* (2006.01)
*B65G 13/11* (2006.01)

(52) U.S. Cl.
CPC ............ *B65G 43/08* (2013.01); *B65G 13/04* (2013.01); *B65G 13/11* (2013.01); *B65G 2201/0264* (2013.01); *B65G 2203/0216* (2013.01); *B65G 2203/046* (2013.01)

(58) Field of Classification Search
CPC ........ B65G 43/08; B65G 13/04; B65G 13/11; B65G 2203/046; B65G 2201/0264; B65G 2203/0216; B65G 47/26; B65G 47/28; B65G 47/29; B65G 47/295; B65G 47/31
See application file for complete search history.

(56) References Cited

U.S. PATENT DOCUMENTS

| | | | |
|---|---|---|---|
| 5,730,274 A * | 3/1998 | Loomer | B65G 13/06 198/460.1 |
| 6,253,909 B1 | 7/2001 | Kalm et al. | |
| 6,325,289 B1 * | 12/2001 | Mazzone | B07C 3/14 235/462.14 |
| 2004/0173440 A1* | 9/2004 | Mauch | B65G 13/06 198/781.05 |
| 2004/0195078 A1* | 10/2004 | Anderson | B65G 13/02 198/781.05 |
| 2006/0226989 A1 | 10/2006 | Hillegass | |
| 2008/0164125 A1* | 7/2008 | Pelak | B65G 13/04 198/781.06 |
| 2012/0024669 A1* | 2/2012 | Danelski | B65G 43/10 198/617 |

(Continued)

FOREIGN PATENT DOCUMENTS

| | | | | |
|---|---|---|---|---|
| DE | 102008026379 B3 * | 12/2009 | ............ | B65G 43/08 |
| DE | 102008026379 B3 | 12/2009 | | |

(Continued)

*Primary Examiner* — Mark A Deuble
(74) *Attorney, Agent, or Firm* — 24IP Law Group USA, PLLC; Timothy R DeWitt

(57) ABSTRACT

A conveyor device for conveying an object with an identification device. The conveyor device comprises a plurality of rollers, connected drive motors for driving the rollers, a transmitter, a receiver for detecting the distance of the identification device and a control device for controlling the connected drive motors.

9 Claims, 3 Drawing Sheets

(56) References Cited

U.S. PATENT DOCUMENTS

| | | | |
|---|---|---|---|
| 2012/0044074 A1* | 2/2012 | Mulla | G06Q 10/08 |
| | | | 340/572.1 |
| 2013/0213768 A1* | 8/2013 | Yokoya | B65G 43/10 |
| | | | 198/462.1 |
| 2014/0034456 A1* | 2/2014 | Gehring | B65G 43/08 |
| | | | 198/810.01 |
| 2014/0240088 A1* | 8/2014 | Robinette | G08B 13/1427 |
| | | | 340/5.61 |
| 2016/0104013 A1* | 4/2016 | Fessler | G01R 25/00 |
| | | | 340/10.1 |
| 2016/0318714 A1* | 11/2016 | Reischl | H04L 61/2038 |
| 2016/0321481 A1* | 11/2016 | Bottazzi | G06K 7/10435 |
| 2017/0017814 A1* | 1/2017 | Roberts | G06K 7/10128 |
| 2017/0061175 A1* | 3/2017 | Lee | G06K 7/10366 |
| 2017/0109558 A1* | 4/2017 | Jones | G06Q 10/087 |
| 2017/0123057 A1* | 5/2017 | Prinz | G01S 13/04 |
| 2017/0137230 A1* | 5/2017 | Combs | B65G 43/10 |
| 2017/0287297 A1* | 10/2017 | Hardie-Bick | G08B 13/242 |
| 2018/0004986 A1* | 1/2018 | Wu | G06K 7/10356 |

FOREIGN PATENT DOCUMENTS

| | | | | |
|---|---|---|---|---|
| DE | 10 2010 037 601 A | | 4/2011 | |
| DE | 102014109402 A1 * | | 1/2016 | G01S 7/032 |

\* cited by examiner

CONVEYOR DEVICE AND METHOD FOR CONVEYING AN OBJECT

CROSS-REFERENCE TO RELATED APPLICATIONS

This application claims benefit of and priority to German Patent Application DE 10 2016 114 182.8, filed on 1 Aug. 2016. The entire disclosure of German Patent Application DE 10 2016 114 182.8 is hereby incorporated by reference.

BACKGROUND OF THE INVENTION

Field Of The Invention

The invention relates to a conveyor device and a method for conveying an object with a conveyor device.

Brief Description of the Related Art

Conveyor devices for conveying an object are known. For example, the U.S. Patent Application Publication No. 2006/0226989 A1 (Hillegass) likewise discloses a conveyor device for conveying an object on a conveyor belt.

The German patent no. DE 10 2008 026 379 B3 (Siemens) likewise describes a method for conveying objects on a transport means. At least part of the objects are provided with an RFID tag and the distance of the RFID tags of two consecutive objects in the movement direction of the transport means is monitored. For the case that the distance is smaller than a predetermined minimum distance, a gap between the objects in question is widened. However, this patent does not disclose how this gap is widened.

SUMMARY OF THE INVENTION

In view of the known technologies and according to a first aspect of the present disclosure, a conveyor device is made available for conveying an object with an identification device, wherein the conveyor device comprises a plurality of rollers, connected drive motors for driving the rollers, a transmitter, a receiver for detecting the distance of the identification device and a control device for controlling the connected drive motors.

In one aspect, the conveyor device is configured such that the transmitter in operation sends a detection signal to the identification device.

In one aspect, the conveyor device is configured such that the receiver in operation receives a positioning signal from the identification device.

In one aspect, the conveyor device is configured such that the drive motor is operable in accordance with the determination of the distance of the identification device.

In one aspect, the conveyor device is configured such that at least one of the plurality of rollers has the receiver for receiving the positioning signal.

In one aspect, the conveyor device is configured such that the transmitter and/or the receiver is integrated in at least one of the rollers.

In one aspect, the conveyor device is configured such that the rollers are arranged in groups and the receiver is allocated to a group of several rollers.

In one aspect, the conveyor device is configured such that the conveyor device has a distributor for distributing the object in accordance with different locations of destination.

In one aspect, the conveyor device is configured such that the identification device is an RFID chip.

According to a second aspect of the present disclosure, a method is made available for conveying an object in a conveyance direction with the aid of a conveyor device with a plurality of rollers. The method comprises therein: Determining the distance of the object from one or several of the plurality of rollers on the conveyor device; and starting at least one of the plurality of rollers upon falling short of a predefined distance.

In one aspect, the method is configured such that the determination of the distance of the object comprises sending a detection signal, producing a positioning signal by the identification device in response to the detection signal and receiving the positioning signal by a receiver.

In one aspect, the method further comprises: Stopping at least one of the plurality of rollers after the passage of the object.

In one aspect, the method further comprises: Changing the conveyance direction of the object.

BRIEF DESCRIPTION OF THE DRAWINGS

The invention will now be explained in more detail with reference to the following figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention. This invention becomes more obvious when reading the following detailed descriptions of some examples as part of the disclosure under consideration of the enclosed drawings. Referring now to the attached drawings which form a part of this disclosure. There are shown:

DETAILED DESCRIPTION

Figure 1:
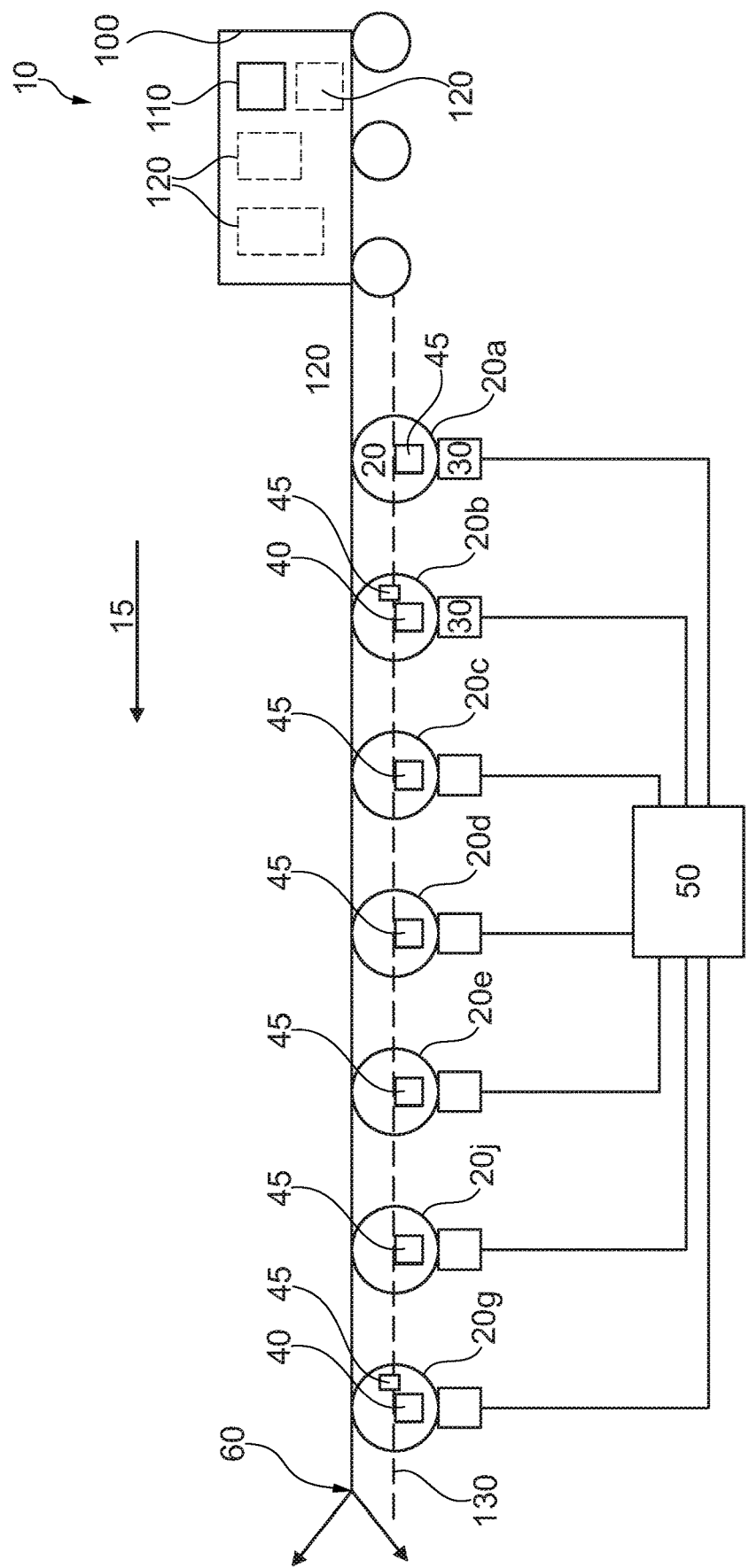
FIG. 1 is a diagram of a conveyor device with a multiplicity of rollers.

FIG. 1 shows by way of example, in the form of a detail of an overall conveyor apparatus consisting of many individual conveyor devices 10, an overview of such a conveyor device 10 with a multiplicity of rollers 20a-g, each of them driven by a drive motor 30. The conveyor device 10 conveys objects 100 on the rollers 20a-g in a conveyance direction 15. The objects 100 have an RFID chip 110, also called RFID tag, or other type of machine-readable identification device 110 with destination specifications, such as order data, from which data can be read out and/or derived, such as the consecutively loaded weight to be expected or for example the storage locations for stored goods to be approached or the location of destination for luggage items, for example. The RFID chip 110 receives a signal from a transmitter 40 and in response thereto, the RFID chip 110 sends a further signal that is received and possibly decoded by a receiver 45. The objects 100 are parcels or luggage items, for example, wherein the type of object is not limiting with respect to the invention.

In one aspect of the conveyor device 10 the transmitter 40 is present in several ones of the rollers 20a-g. For example, FIG. 1 shows two transmitters 40 integrated in the rollers 20b and 20g. In the rollers 20a-g receivers 45 are integrated as well. In principle, it would also be possible to integrate a combined transmitter/receiver device 40, 45 in all or in few of the rollers 20a-g, wherein the exact number of the combined transmitter/receiver devices 40, 45 depends on the necessity of receiving the signals sent by the RFID chip 110 with sufficient strength. It also appears to be workable to integrate the transmitter/receiver device 40, 45 in the edge region of the roller, for example in the region of the bearing or completely outside, in the transition region from the roller to the receiving frame 130 or also in the receiving frame 130 itself.

Figure 2:
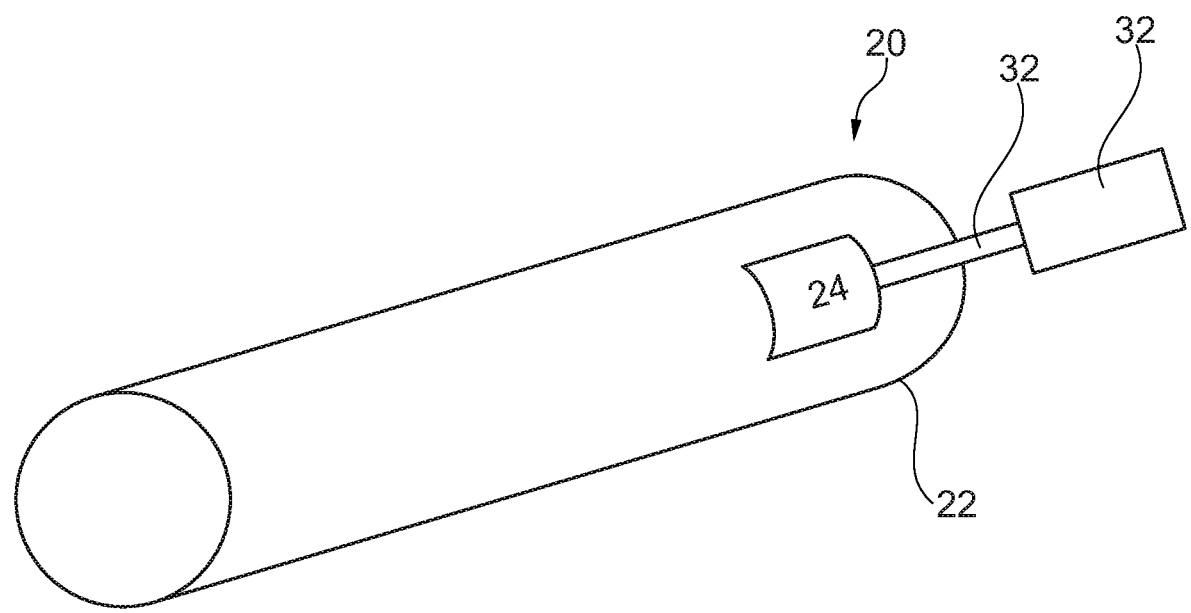
FIG. 2 is a diagram of one of the rollers in the conveyor device.

FIG. 2 shows an example of one of the rollers 20a-g. The rollers 20a-g most frequently consist of a metal pipe with bearings on both sides and can have a complementary roller cover 22, which is produced optionally of a rubber or a polymer. However, in principle, also further embodiments and materials are conceivable with respect to the rollers. The objects 100 are conveyed through the friction between the object 100 and the roller and/or the roller cover 22. A shaft 32 is connected to a gear 24 in the roller 20 and to a drive motor 30, and drives the roller 20. It is irrelevant for the subject matter of the invention whether the drive units are disposed outside of or integrated entirely in the rollers. In addition to the combination of drive motor 30 and gear 24 shown here, also embodiments with a direct drive are possible, which do not require a gear.

The drive motor 30 in the embodiment shown in FIG. 1 is connected to a control unit 50 arranged outside of the roller. The control unit 50 can switch the drive motors 30 on and off, which are connected to the rollers 20a-g. Without limiting the invention, it is possible to equip each roller with a separate control unit 50 and equally to attach the same outside of the rollers or integrate the same in the individual rollers. It is essential for the invention that the rollers can be controlled preferably individually or in small groups. The transmitters 40 and the receivers 45 cooperate in order to detect the position or the proximity of an object 100 or the distance to the object 100 on the conveyor device 10 by sending a detection signal TE and receiving a positioning signal TO. The detection signal TE is produced and sent by the transmitter 40 and received by the RFID chip 110. The RFID chip 110 sends a positioning signal TO in response thereto. The positioning signal TO is received and processed by the receiver 45 in the rollers 22a-g.

Through the strength of the positioning signal TO, the receiver 45 can ascertain the distance of the object 100 to the roller 22a-g. As soon as the object 100 appears in the vicinity of one of the rollers 20a-g, i.e. when a predetermined distance is fallen short of, the roller 20a-g in question is switched on and set into operation. This requires a separate control of each individual roller. However, it is possible likewise to operate groups of rollers in combination in accordance with this procedure. The object 100 is thus conveyed from one of the rollers 20a-g to a further one of the rollers 20a-g After conveyance of the object 100 via the roller 20a-g, the roller 20a-g in question is switched off in order save energy.

In a different aspect of the conveyor device 10 the rollers 20a-g are largely autonomous, and the control signal for switching the rollers 20a-g on and off is not forwarded via a central control unit 50, but directly from one receiver 45 to one or several drive motors 30.

The rollers 20a-g can also be arranged in groups and the receiver 45 can be adjusted such that the proximity of the object 100 switches on a group of several rollers 20.

In a further aspect of the conveyor device 10, the conveyor device 10 can have a distributor 60, for example a divert gate. The positioning signal TO in this case contains information about a location of destination for the object 100. One of the receivers 45 controls the divert gate 60 after receipt of the positioning signal TO from the RFID chip 110 and can thus distribute the objects 100 in several directions in accordance with the location of destination. In cooperation with the control units 50 forming part of the overall logistics system, it is also possible to determine the generally variable location of destination from the specific data of the identification device 110 and to then flexibly route a defined path including the final location of destination. It is advantageous here to be able to trace and/or track down the exact location of the object 100 to be conveyed at any given time. Even a removal of the object 100 from the conveyor device 10 could be localized, due to the permanent data exchange between the identification device 110 and the control devices 50 along the complete conveyor device 10. It is advantageous in addition that the conveyor device 10 consisting of many rollers 20 and possibly also other conveyance means, such as conveyor belts, can be adjusted flexibly at any time on the basis of the specific data stored in the identification device 110 about the conveyed good 120 within the object 100, for example to a change in weight due to successive additions of load. When the data are linked expediently, a plausibility control could be effected continuously, as to whether the required conveyor capability correlates with the expected weight of the object to be conveyed. For this purpose, sensitively controllable drive motors 30 are suitable, preferably in the form of direct drives. When these preconditions are fulfilled, it would even be possible to detect and localize the possibly unauthorized removal of conveyed goods from the object 100 in the form of a transport container. Such a conveyor device is used for controlling external filling/loading/ stocking devices, which are used in mail-order trading, in particular the flow of goods is controlled using an identification device or tag, for example within a warehouse.

Figure 3:
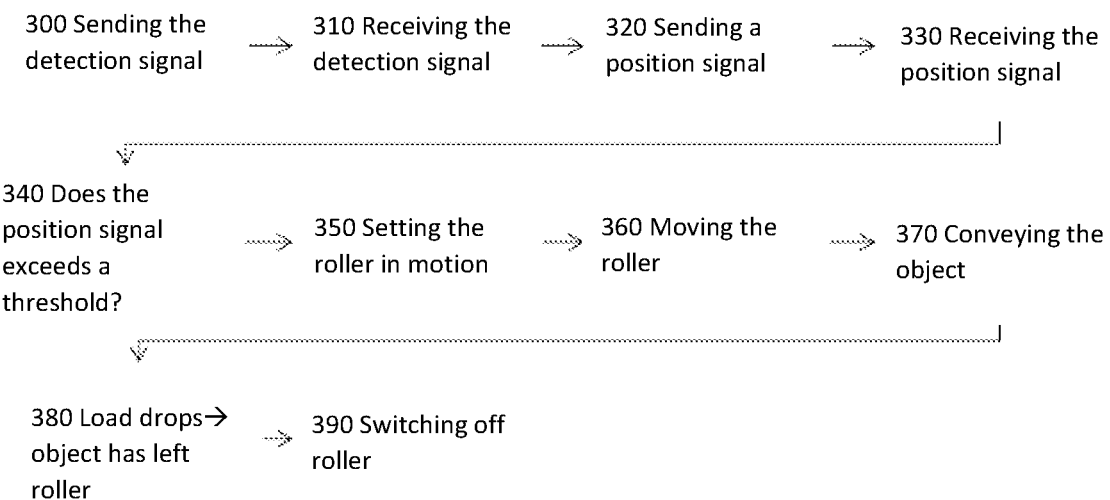
FIG. 3 is an illustration of a sequence of the method.

FIG. 3 shows the sequence of a method for conveying the object 100. In a first step 300, the transmitter 40 sends the detection signal TE, which is received in the step 310 by the RFID chip 110 on an object 100 in the vicinity of the transmitter 40. In the subsequent step 320, the RFID chip 110 on the object 100 sends a positioning signal TO in response to the detection signal TE. This positioning signal TO is received by one or several of the receivers 45 in the rollers 22a-g in step 330. The strength of the positioning signal TO depends on the distance of the RFID chip 110 to the receiver 45. As soon as the strength of the positioning signal TO exceeds a predetermined threshold value in one of the rollers 22a-g in step 340, this roller 22a-g is set in motion in step 350 and starts rotating. In a particularly advantageous embodiment, this waking is supported by the control unit 50, since it is thus possible to detect the information about rotating adjacent rollers 20 and, on the basis of this, indirectly an approaching object 100 to be conveyed, redundantly to the information from the identification device 110, and to thus increase the robustness of the overall system.

The object 100 touches the roller 22a-g in the step 360 and is conveyed further through the rotational movement of the roller 22a-g in the step 370. In the step 380 the load drops as soon as the object 100 has left the roller 22a-g. As soon as the object 100 does no longer touch the roller 22a-g, the roller 22a-g is switched off in the step 390. This touch can be detected either by a touch sensor or a weight sensor in the roller 22a-g.

In a further aspect of the method, the movement direction of the object 100 can be changed, for example by a divert gate 60 or distributor. Thus, the object 100 can be diverted to a different location of destination within the system.

The rotational speed of the rollers 22a-g needs to be synchronized. This synchronization can be effected either via the control unit 50 or by sending control signals from one drive motor 30 to another drive motor 30. In one aspect, it is also possible to adjust the rotational speed of the rollers 22a-g such that the distances between individual ones of the objects 100 are changed.

While merely a number of selected embodiments have been chosen to describe the present method, persons skilled in the art will understand on the basis of this disclosure that various changes and modifications can be effected here without deviating from the scope of the invention as defined in the attached claims.

LIST OF REFERENCE NUMBERS

10 conveyor device
15 conveyance direction
20a-g roller
22 roller cover
24 gear
30 drive motor
32 shaft
40 transmitter
45 receiver
50 control device
60 distributor
100 object
110 identification device
120 conveyed good
130 receiving frame

What is claimed is:

1. A conveyor device for conveying an object with an identification device, wherein the conveyor device comprises:
   a plurality of rollers;
   connected drive motors for driving the rollers;
   a transmitter;
   a receiver for detecting a distance from an identification device in an object to at least one of said plurality of rollers, wherein the identification device is an RFID chip, and wherein the receiver in operation receives a positioning signal from the identification device, and wherein at least one of the plurality of rollers has the receiver for receiving the positioning signal; and
   a control device for controlling the connected drive motors.

2. The conveyor device according to claim 1, wherein the transmitter in operation sends a detection signal to the identification device.

3. The conveyor device according to claim 1, wherein the drive motor is operable in accordance with the determination of the distance of the identification device.

4. The conveyor device according to claim 1, wherein at least one of the transmitter and the receiver is integrated in at least one of the rollers.

5. The conveyor device according to claim 1, wherein at least some of the plurality of rollers are arranged in groups of rollers and the receiver is allocated to one of the groups of rollers.

6. The conveyor device according to claim 1, wherein the conveyor device has a distributor for distributing the object in accordance with different locations of destination.

7. A method for conveying an object in a conveyance direction with the aid of a conveyor device, the conveyor device having a plurality of rollers, connected drive motors for driving the rollers, a transmitter, a receiver, and a control device, wherein the object has an identification device, the identification device being an RFID chip, the method comprising:
   determining the distance of the object from at least one of the plurality of rollers on the conveyor device, wherein the determination of the distance of the object comprises sending a detection signal, producing a positioning signal by the identification device in response to the detection signal and receiving the positioning signal from the identification device by the receiver on at least one of the plurality of rollers; and
   starting at least one of the plurality of rollers upon falling short of a predefined distance.

8. The method according to claim 7, further comprising: stopping at least one of the plurality of rollers after the passage of the object.

9. The method according to claim 7, further comprising: changing the conveyance direction of the object.

* * * * *